United States Patent

[11] 3,576,572

[72] Inventor Norman Braslau
Katonah, N.Y.
[21] Appl. No. 744,952
[22] Filed July 15, 1968
[45] Patented Apr. 27, 1971
[73] Assignee International Business Machines Corporation
Armonk, N.Y.

[54] VOLTAGE-STABLE NEGATIVE RESISTANCE DEVICE
16 Claims, 8 Drawing Figs.

[52] U.S. Cl. 340/173, 307/286, 307/323, 331/96
[51] Int. Cl. G11c 11/36, H03k 3/31
[50] Field of Search 340/173, 173 (NR); 307/238, 286, 322; 331/96, 97, 132, 107, 107 (G)

[56] References Cited
UNITED STATES PATENTS

| | | | |
|---|---|---|---|
| 2,914,249 | 11/1959 | Goodall | 340/123X |
| 2,975,377 | 3/1961 | Price et al. | 340/173X |
| 2,986,724 | 5/1961 | Jarger | 340/173X |
| 3,105,957 | 10/1963 | Li | 340/173 |

OTHER REFERENCES
E. J. Slobodzinski, " Microwave Memory Element Using A Tunnel Diode," IBM TDB v 2, n 6, April 1960, pp. 71— 72

*Primary Examiner*—Terrell W. Fears
*Attorney*—Hanifin & Jancin

ABSTRACT: A voltage-stable, negative resistance device is provided that comprises a bulk material which is subjected to both a selected Radio Frequency electric field and a DC bias electric field. A pair of such devices provides a memory when mounted in a waveguide that is subjected to either a standing wave field or a traveling wave field.

STANDING WAVE

FIG. 1
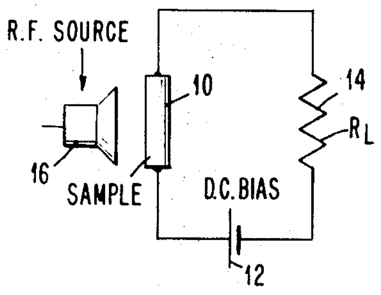
FIG. 2
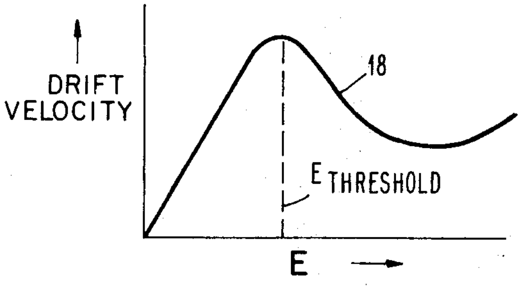
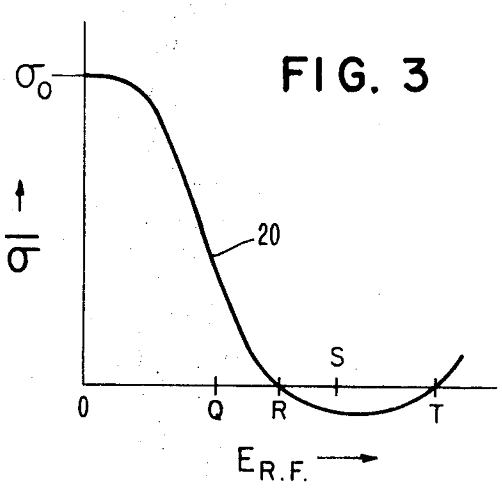
FIG. 3
FIG. 4
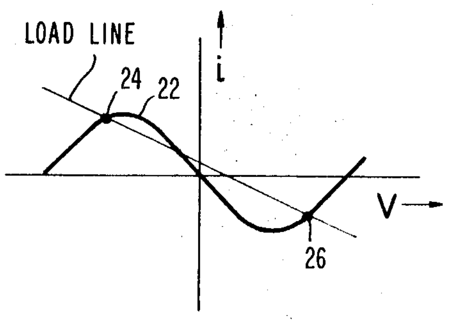
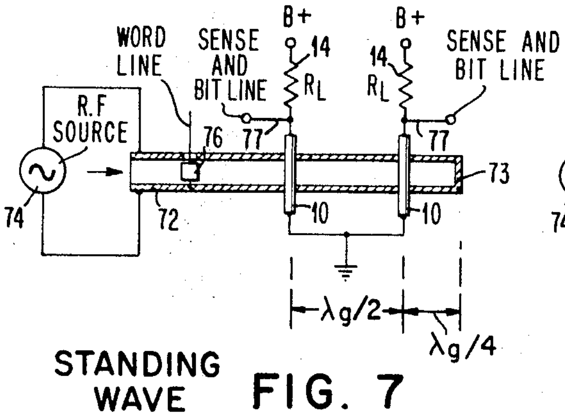
STANDING WAVE FIG. 7
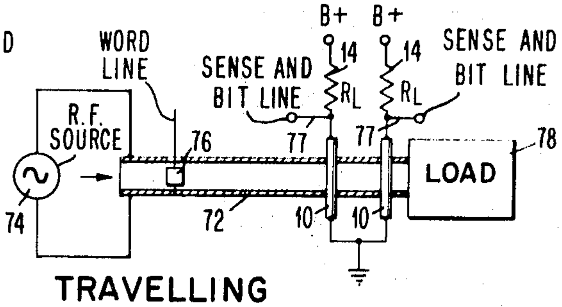
TRAVELLING WAVE FIG. 8
INVENTOR
NORMAN BRASLAU
BY Harry M Weiss
ATTORNEY

VOLTAGE-STABLE NEGATIVE RESISTANCE DEVICE

THE DISCLOSURE BACKGROUND

1. Field of the Invention

This invention relates generally to voltage-stable, negative resistance devices, and more particularly, to voltage-stable, negative resistance GaAs devices.

2. Description of the Prior Art

Previously, in an article appearing in the *Journal of Applied Physics*, Vol. 32, No. 12, p. 2606, (1961) by J. Zucker, et al., Ge and Si were subjected to a combined radio frequency field and DC field, and it was observed that the average or DC conductivity of the sample was decreased from its bulk value. However, despite a great deal of study of GaAs as indicative of the following references:

a. "Measurement of the Velocity-Field Characteristic of Gallium Arsenide," by J. G. Ruch et al., *Applied Physics Letters*, Vol. 10, No. 2 Jan. 15, 1967, p. 40;
b. "Calculation of the Velocity-field Characteristic for Gallium Arsenide," by P. N. Butcher et al., *Physics Letters*, Vol. 21, No. 5, June 15, 1966, p. 489;
c. "Measurement of the Negative Differential Mobility of Electrons in GaAs," by J. B. Gunn, et al., *Physics Letters*, Vol. 22, No. 4, Sept. 1, 1966, p. 369;
d. "Determination of the Negative Differential Mobility of N-Type Gallium Arsenide Using 8 mm.-Microwaves," by G. A. Acket, *Physics Letters*, Vol. 24A, (1967) p. 200;
e. "Velocity-Field Characteristic Of Gallium Arsenide From Measurement Of The Conductivity In A Microwave Field," By by N. Braslau, Physics Letters, Vol. 24A, (1967), p. 531.

it was never appreciated that GaAs, should it display the theoretically expected velocity-field characteristic, when subjected to both a selected radio frequency field and a DC bias field would exhibit voltage-stable, negative resistance characteristics.

Accordingly, it is an object of this invention to provide a voltage-stable negative resistance device.

It is a further object of this invention to provide a voltage-stable, negative resistance GaAs device.

It is a further object of this invention to provide a memory by using at least two voltage-stable negative resistance devices mounted within a waveguide and subjected to either a standing wave or traveling wave field.

In accordance with one embodiment of this invention, a voltage-stable, negative resistance device is provided which comprises a bulk material having a velocity-field characteristic $v(E)$ with sufficient negative differential mobility to satisfy the condition $$0>\bar{\sigma}(E_{\mathrm{R.F.}})=\frac{ne}{2\pi E_{\mathrm{b}}}\int_0^{2\pi}v(E_{\mathrm{b}}+E_{\mathrm{R.F.}}\sin\omega t)d(\omega t)$$

where $\bar{\sigma}$ is the average conductivity of the bulk material which is a function of an RF field applied to the bulk material, $n$ is the charge carrier density in the bulk material, $e$ is the electronic charge, $E_b$ is a DC bias field applied to the bulk material, $\omega$ is the angular frequency of the RF field, and the integral is taken over one RF cycle. A nonzero DC bias field $E_b$ is provided to the bulk material which is less than the threshold field which would nucleate a high field domain in the bulk material. An RF field $E_{RF}$ is applied to the bulk material which also satisfies the equation $$|E_{\mathrm{R}}|\leq|E_{\mathrm{R.F.}}|\leq|E_{\mathrm{T}}|$$

where $E_R$ and $E_T$ are the two points on the curve of FIG. 3 where the conductivity $\bar{\sigma}$ is zero, the RF field having an angular frequency $\omega$ such that $\omega_G<\omega<\omega_\tau$ where $\omega_\tau$ is the carrier relaxation frequency and $\omega_G$ is a frequency which permits significant electric field rearrangement to take place in said bulk material during that portion of the RF period where the total electric field exceeds the threshold value.

In accordance with another embodiment of this invention, a pair of voltage-stable, negative resistance devices are mounted in a wave guide and subjected to either a traveling wave field or a standing wave field. Word, bit and sense lines are provided to complete the memory.

The foregoing and other objects, features and advantages of the invention will be apparent from the following more particular description of the preferred embodiments of the invention, as illustrated in the accompanying drawings.

BRIEF DESCRIPTION OF THE DRAWINGS

FIG. 1 is a view showing the negative resistance device of this invention in a circuit which contains a voltage source providing a DC bias, a resistance load, and an RF source for applying an RF field to the bulk material of said device.

FIG. 2 is a graph showing the drift velocity-field characteristic of the bulk material from which the negative resistance device of this invention is fabricated, showing a region of decrease in drift velocity with increasing electric field.

FIG. 3 is a graph showing the relationship between the average conductivity $\bar{\sigma}$ with increasing RF field $E_{RF}$ of the negative resistance device of this invention.

FIG. 4 is a graph of the negative resistance characteristic of the device of this invention showing the relationship between current and voltage and the bistable characteristics of the device when a load is applied thereto.

FIG. 7 is a view, which is partly in section, of a memory embodiment wherein two of the devices of this invention are located in a waveguide that is subjected to a standing wave, radio frequency electric field.

FIG. 8 is a view, which is partly in section of a memory arrangement wherein two of the devices of this invention are mounted in a waveguide which is subjected to a traveling wave, radio frequency electric field.

DESCRIPTION OF THE PREFERRED EMBODIMENTS

Figures 5, 6:
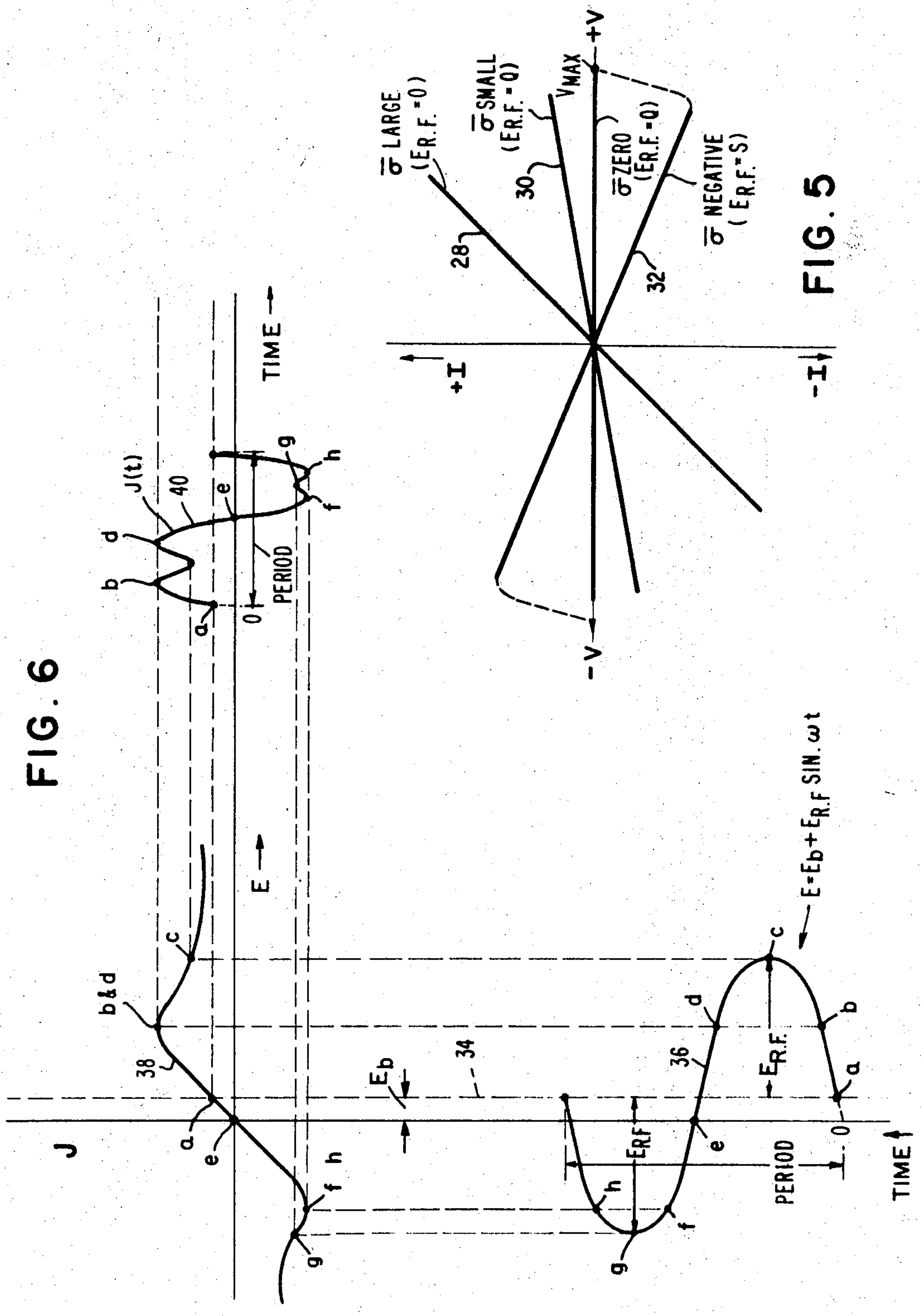
FIG. 5 is a graph showing the current-voltage relationship of the sample in the circuit shown in FIG. 1 for the different values of the average conductivity $\bar{\sigma}$ as depicted in FIG. 3.
FIG. 6 is a graph showing the application of the combination DC bias field and the RF field on the device of this invention and the current waveform generated therefrom, the average conductivity being proportional to the average value of this waveform over one RF cycle.

Referring to FIG. 1, a sample 10 is connected in series to a DC bias source 12 and a load resistance 14. An RF source 16 provided by a magnetron, klystron, etc., provides a radio frequency electric field $E_{RF}$ to the sample 10.

The sample 10 is a bulk material which can be made up of single or multielement materials that exhibit a region of negative differential mobility when subjected to both a nonzero DC bias field and a suitable radio frequency field.

The bulk material 10 has a velocity-field characteristic $V(E)$ with sufficient negative differential mobility to satisfy the condition $$0>\bar{\sigma}(E_{\mathrm{R.F.}})=\frac{ne}{2\pi E_{\mathrm{b}}}\int_0^{2\pi}v(E_{\mathrm{b}}+E_{\mathrm{R.F.}}\sin\omega t)d(\omega t)\qquad(1)$$

where $\bar{\sigma}$ is the average conductivity of the bulk material which is a function of the RF field applied to the bulk material, $n$ is the charge carrier density in the bulk material, $e$ is the electronic charge, $E_b$ is a DC bias field applied to the bulk material, $\omega$ is the angular frequency of the RF field, and the integral is taken over one RF cycle.

The battery source 12 provides a nonzero DC bias field $E_b$ which is less than the threshold field that would nucleate a high field domain in the bulk material where the bulk material is a semiconductor such as N-type gallium arsenide. The DC bias field $E_b$ satisfied the condition $$0<|E_{\mathrm{b}}|\leq|E_{\mathrm{Max.}}|<|E_{\mathrm{Threshold}}|\qquad(2)$$

where the magnitude of the DC bias field $E_b$ is greater than 0 and less than or equal to the magnitude of the maximum electric field $E_{Max}$ permitted by the above integral equation.

Referring to FIG. 2, the graph depicts a curve 18 exhibited by the bulk material 10 of the device indicating the negative resistance characteristics thereof. The downward slope of the curve 18 indicating the reduction in drift velocity with increasing electric field illustrates the region of differential mobility of the bulk material 10.

Referring to FIG. 3, the graph of this FIG. shows the change in the average conductivity $\bar{\sigma}$ exhibited by the bulk material 10 with increasing RF electric field applied to the bulk material 10 by the RF source 16. When there is no applied radio frequency field, i.e., at 0 RF field, the bulk value of the conductivity is $\sigma_0$ as shown in the FIG. Curve 20 of FIG. 3 illustrates how the average conductivity decreases with increasing radio frequency field to the extent that at points R and T of the abscissa axis the average conductivity is 0 at particular radio frequency field values greater than 0. The point S on the abscissa is one point where the radio frequency field $E_{RF}$ has a value $E_s$ such that the average conductivity is negative. The point S is located between points R and T on the curve 20. At the point Q the value of the radio frequency field $E_{RF}$ is $E_Q$, and the average conductivity is decreasing, but is still positive. With reference to FIG. 3, the RF electric field $E_{RF}$ that is applied to the sample 10 satisfies the equation $$|E_{\mathrm{R}}| \leq |E_{\mathrm{R.F.}}| \leq |E_{\mathrm{T}}|$$

where $E_R$ and $E_T$ are the two points on the curve 20 of FIG. 3 where the average conductivity $\bar{\sigma}$ is 0. When the applied radio frequency field is in the range given by the above expression the average conductivity $\bar{\sigma}$ is negative, thereby permitting the bulk material 10 to exhibit negative resistance characteristics.

Referring to FIG. 4, the graph shows the negative resistance characteristics exhibited by the device as illustrated by curve 22 showing the relationship between the current and voltage for said device. The load resistance $R_L$ permits the bulk material 10 to exhibit bistable characteristics at points 24 and 26 when the load 14 is connected in series with the bulk material 10 and the voltage source 12. This bistable characteristic allows the device to be used, for example, in memory applications.

Referring to FIG. 5, the graph of this FIG. shows the lines generated for the different values of the average conductivity $\bar{\sigma}$ and the applied RF field $E_{RF}$ as depicted in FIG. 3. Accordingly, line 28 on the I—V graph of FIG. 5 represents the relationship between the current I and the voltage V for the bulk material 10 when $E_{RF}$=0 and $\bar{\sigma}$ is large. Line 30 represents the relationship between the current and voltage of the bulk material 10 when $\bar{\sigma}$ is small and $E_{RF}$ is equal to $E_Q$ (See FIG. 3). The abscissa axis is representative of the current-voltage relationship for the condition that $\bar{\sigma}$ is 0 and $E_{RF}$ is equal to $E_R$. Line 32 represents the current-voltage relationship upon the condition that $\bar{\sigma}$ is negative and $E_{RF}$ is equal to $E_S$ as, shown in FIG. 3. The dotted sections of line 32 show that the average conductivity is changed from negative to positive for $E_{RF}$ equal to $E_S$ if the magnitude of the bias field, $E_b$, is increased sufficiently to reverse the inequality of the integral equation (1). This magnitude corresponds to the value $E_{max}$ defined in equation (2) and is schematically shown in FIG. 5 as corresponding to an applied voltage $V_{max}$.

Referring to FIG. 6, this graph shows how the current through the device is determined in the presence of the combined DC and RF fields. Dotted line 34 represents the nonzero DC bias field that is applied to the sample 10 by means of the battery 12. If desired, the DC bias can be negative which would shift the dotted line 34 to the opposite side of the axis. Sinusoidal curve 36 represents the applied RF field $E_{RF}$. Curve 38 repeats the bulk characteristic curve of FIG. 2. Curve 40 is a curve that illustrates the current waveform generated during one period of the RF field that is applied to the device. The letters *a, b, c, d, e, f, g, h* and *j* of curve 36 correspond to the similarly noted portions of the curve 38 and the curve 40 to provide an indication of the relationship between the total applied field on the current characteristics of the negative resistance device of this invention. The average conductivity is defined as the average value of this current waveform over one RF cycle, divided by $E_b$.

The RF that is applied to the sample 10 has an angular frequency $\omega$ such that $\omega_G<\omega<\omega_\tau$ where $\omega_\tau$ is the carrier relaxation frequency and $\omega_G$ is a frequency low enough to permit significant electric field rearrangement to take place in the bulk material during that portion of the RF period where the total electric field exceeds the threshold value. The load $R_L$ resistance 14, which is connected in series with the bulk material 10 and the nonzero DC bias field means or battery 12, satisfies the condition $R_L>|-R_{Bulk}|$ where $-R_{Bulk}$ is the negative resistance of the bulk material. The negative average conductivity is the reciprocal of the negative resistance of the bulk material.

In one embodiment, the bulk material 10 is N-type gallium arsenide that has an impurity concentration of about $10^{15}$ impurities per cubic centimeter. The RF field that is applied to the gallium arsenide material is in the range of several kilovolts per centimeter and preferably in the range of about 10 kilovolts per centimeter. The RF field $E_{RF}$ is applied simultaneously with and parallel to the nonzero DC bias field $E_b$ to attain the negative resistance characteristics at the device terminals. Ohmic contacts are provided to the gallium arsenide sample 10 in order to complete the circuit of FIG. 1. The sample used had a thickness of about 35 centimeters and a length of about 7 centimeters. However, the size of the sample can be varied, as desired.

Referring to FIG. 7, a memory embodiment is shown using, for example, two negative resistance devices or samples 10. The two samples 10 are mounted on the axis of shorted waveguide 72. A standing wave radio frequency field is present in the waveguide 72 since the waveguide 12 is shorted at 73. An RF source 74 such as provided by a magnetron or klystron supplies RF energy to the waveguide 72. The device 10 closest to the shorted portion 73 of the waveguide 72 is spaced $n\lambda g/4$ from the shorted portion where $\lambda_g$ is the guide wavelength and $n$ is a positive integer. The two devices 10 are spaced $m\lambda g/2$ from each other, where $m$ is a positive integer, and one end of each device is connected to ground. A switch 76 is provided at the input portion of the waveguide 72 which functions to vary the amount of RF field in the waveguide 72. The switch 76 which is, for example, a PIN diode mounted in the waveguide, serves as the word line for the memory arrangement of FIG. 7. Resistance ($R_L$) load 14 is provided between a DC bias source (B+) and the other end of each of the devices 10. Sense and bit lines 77 are connected between the resistance loads 14 and the other end of the devices. Each device contributes one memory cell and any desired number of devices may be used in the embodiment of FIG. 7 providing that the devices are spaced such that they are located near standing wave maxima. A reading operation is carried out by applying a signal to the word line which, by means of the switch 76, lowers the RF field in the waveguide 72 to a value such as $E_Q$ (see FIG. 3) from a value $E_S$. Accordingly, if one or the other of the devices 10 is in a 1 state which is represented by the position of point 26 on curve 22 of FIG. 4, a voltage drop is sensed on the sense line 77 when the RF field is lowered. Correspondingly, if one or the other of the devices is in a 0 state which is represented by the position of point 24 on curve 22 of FIG. 4, a voltage increase is sensed on the sense line 77 when the RF field is lowered.

Writing is accomplished by applying to the bit line 77 of the selected device or cell 10 either a negative signal to place the selected cell 10 in the 0 state (point 24 of curve 22 of FIG. 4) or a positive signal to place the selected cell 10 in the 1 state (point 26 of curve 22 of FIG. 4).

Referring to FIG. 8, like reference numerals used in FIG. 7 refer to the same elements in FIG. 8. The operation of the memory cells 10 of FIG. 8 are the same as in FIG. 7 for both reading and writing functions. FIG. 8 differs from FIG. 7 in that FIG. 8 is an embodiment where a traveling wave is used in the waveguide 72 which is not shorted as in FIG. 7. An RF load 78 is used to dissipate the energy in the waveguide at the output portion thereof. In FIG. 8, there is no fixed spacing as in FIG. 7, required for the devices 10 in the waveguide 72.

While the invention has been particularly shown and described with reference to preferred embodiments thereof, it will be understood by those skilled in the art that various changes in form and details may be made therein without departing from the spirit and scope of the invention.

I claim:

1. A negative resistance device comprising, in combination:

a bulk material having a velocity-field characteristic $V(E)$ with sufficient negative differential mobility to satisfy the condition $$0>\bar{\sigma}(E_{\mathrm{R.F.}})=\frac{ne}{2\pi E_{\mathrm{b}}}\int_0^{2\pi} v(E_{\mathrm{b}}+E_{\mathrm{R.F.}}\sin\omega t)d(\omega t)$$

where $\bar{\sigma}$ is the average conductivity of the bulk material which is a function of an RF field applied to the bulk material, $n$ is the charge carrier density in the bulk material, $e$ is the electronic charge, $E_b$ is a DC bias field applied to the bulk material, $\omega$ is the angular frequency of the RF field, and the integral is taken over one RF cycle;

means for providing to said bulk material a nonzero DC bias field $E_b$ which is less than the threshold field which would nucleate a high field domain in the bulk material; and means for providing to said bulk material an RF field $E_{RF}$ which also satisfies the condition $$|E_{\mathrm{R}}|\leq|E_{\mathrm{R.F.}}|\leq|E_{\mathrm{T}}|$$

where $E_R$ and $E_T$ are the two points on the curve of FIG. 3 where the average conductivity $\bar{\sigma}$ is zero, said RF field having an angular frequency $\omega$ such that $\omega_G<\omega<\omega_r$ where $\omega_r$ is the carrier relaxation frequency and $\omega_G$ is a frequency which permits significant electric field rearrangement to take place in said bulk material during that portion of the RF period where the total electric field exceeds the threshold value.

2. A negative resistance device in accordance with claim 1, wherein said nonzero DC bias field $E_b$ satisfies the condition $$0<|E_{\mathrm{b}}|\leq|E_{\mathrm{Max.}}|<|E_{\mathrm{Threshold}}|$$

where the magnitude of said nonzero DC bias field $E_b$ is greater than 0 and either less than or equal to the magnitude of a maximum field $E_{Max}$ permitted by the integral equation which field is below the threshold field $E_{Threshold}$ that would nucleate a high field domain in said bulk material.

3. A negative resistance device in accordance with claim 1, wherein said bulk material comprises a semiconductor.

4. A negative resistance device in accordance with claim 3, wherein said semiconductor bulk material comprises gallium arsenide.

5. A negative resistance device in accordance with claim 4, wherein said gallium arsenide bulk material having donor impurities making said gallium arsenide bulk material N-type.

6. A negative resistance device in accordance with claim 5, wherein the impurity concentration of said donor impurities being about $10^{15}$ atoms per cubic centimeter.

7. A negative resistance device in accordance with claim 1, including a load resistance $R_L$ in series with said bulk material and said nonzero DC bias field means $E_b$, said load resistance $R_L$ satisfies the condition $$R_{\mathrm{L}}>|-R_{\mathrm{Bulk}}|=\left|\frac{1}{-\bar{\sigma}(E_{\mathrm{R.F.}})}\right|$$

where $-R_{Bulk}$ is the negative resistance of said bulk material.

8. A negative resistance device in accordance with claim 1, wherein said nonzero DC bias field $E_b$ and said RF field $E_{RF}$ being applied simultaneously to said bulk material.

9. A negative resistance device in accordance with claim 1, wherein said nonzero DC bias field $E_b$ and said RF field $E_{RF}$ being applied simultaneously to said bulk material, and said nonzero DC bias field $E_b$ satisfies the condition $$0<|E_{\mathrm{b}}|\leq|E_{\mathrm{Max.}}|<|E_{\mathrm{Threshold}}|$$

where the magnitude of said nonzero DC bias field $E_b$ is greater than 0 and either less than or equal to the magnitude of a maximum field $E_{Max}$ permitted by the integral equation which field is below the threshold field $E_{Threshold}$ that would nucleate a high field domain in said bulk material.

10. A negative resistance device in accordance with claim 9, wherein said bulk material comprises N-type gallium arsenide.

11. A negative resistance device in accordance with claim 10, wherein said RF field $E_{RF}$ being in the range of about several kilovolts per centimeter.

12. A negative resistance device in accordance with claim 11, including a load resistance $R_L$ in series with said bulk material and said nonzero DC bias field means $E_b$, said load resistance $R_L$ satisfies the condition $$R_{\mathrm{L}}>|-R_{\mathrm{Bulk}}|=\left|\frac{1}{-\bar{\sigma}(E_{\mathrm{R.F.}})}\right|$$

where $-R_{Bulk}$ is the negative resistance of said bulk material, and ohmic contacts providing electrical contact to said gallium arsenide material.

13. A memory comprising:

a plurality of negative resistance devices having bistable characteristics with one state representative of a 1 storage state and the other state representative of a 0 storage state, each said device being comprised of a bulk material having a velocity-field characteristic $V(E)$ with sufficient negative differential mobility to satisfy the condition:

$$0>\bar{\sigma}(E_{\mathrm{R.F.}})=\frac{ne}{2\pi E_{\mathrm{b}}}\int_0^{2\pi} v(E_{\mathrm{b}}+E_{\mathrm{R.F.}}\sin\omega t)\,d(\omega t)$$

where $\bar{\sigma}$ = average conductivity of the bulk material, $n$ = charge carrier density in the bulk material, $e$ = electronic charge, $E_b$ = DC bias field applied to the bulk material, $E_{RF}$ = RF field applied to the bulk material, and $\omega$ = angular frequency of the RF field $E_{RF}$;

means for applying an RF field $E_{RF}$ to said devices;

means for applying a nonzero DC bias $E_B$ to said devices, said RF field and said DC bias permitting said device to exhibit negative resistance characteristics;

means for establishing a storage state in selected devices;

means for reading said storage states from selected devices.

14. The memory of claim 13, wherein said bistable devices are mounted in a waveguide, said RF field being a standing wave field, said bistable devices being positioned where said RF electrical field is a maximum.

15. The memory of claim 13, wherein said bistable devices are mounted in a waveguide and said RF field is a traveling wave field.

16. The memory of claim 13, wherein said RF field is applied to all of said devices simultaneously, each device having means attached thereto for selectively applying voltage pulses to said devices to change the storage state of said devices.